United States Patent
Kumar et al.

(10) Patent No.: US 11,755,222 B2
(45) Date of Patent: Sep. 12, 2023

(54) FILE BASED ENCRYPTION FOR MULTI-PATHING DEVICES

(71) Applicant: EMC IP Holding Company LLC, Hopkinton, MA (US)

(72) Inventors: Kundan Kumar, Bangalore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 456 days.

(21) Appl. No.: 17/186,354

(22) Filed: Feb. 26, 2021

(65) Prior Publication Data

US 2022/0276799 A1   Sep. 1, 2022

(51) Int. Cl.
*G06F 3/06* (2006.01)
*G06F 21/60* (2013.01)

(52) U.S. Cl.
CPC .......... *G06F 3/0643* (2013.01); *G06F 3/0623* (2013.01); *G06F 3/0673* (2013.01); *G06F 21/602* (2013.01)

(58) Field of Classification Search
CPC .... G06F 3/0643; G06F 3/0623; G06F 3/0673; G06F 21/602; G06F 3/067; G06F 3/0689; G06F 21/6209
See application file for complete search history.

(56) References Cited

U.S. PATENT DOCUMENTS

| | | | |
|---|---|---|---|
| 6,567,397 B1 | 5/2003 | Campana et al. |
| 6,687,746 B1 | 2/2004 | Shuster et al. |
| 6,697,875 B1 | 2/2004 | Wilson |

(Continued)

FOREIGN PATENT DOCUMENTS

| | | | |
|---|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Carl G Colin
*Assistant Examiner* — Hany S. Gadalla
(74) *Attorney, Agent, or Firm* — Ryan, Mason & Lewis, LLP

(57) ABSTRACT

An apparatus comprises a processing device configured to control delivery of input-output operations from a host device to a storage system over selected ones of a plurality of paths through a network. The processing device is further configured to identify whether operational information of the host device corresponding to a given write input-output operation comprises one or more index nodes, and to analyze the one or more index nodes responsive to a positive identification. The processing device is also configured to determine whether one or more portions of data corresponding to the given write input-output operation comprise file data based on the analysis of the one or more index nodes, to encrypt at least part of the file data responsive to an affirmative determination, and to deliver the given write input-output operation comprising the encrypted file data to the storage system.

20 Claims, 6 Drawing Sheets

(56) References Cited

U.S. PATENT DOCUMENTS

| | | |
|---|---|---|
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,471,595 B1 * | 10/2016 | Vempati ............... G06F 12/00 |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0091114 A1 * | 5/2004 | Carter ............... G06F 21/606 |
| | | 380/259 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0307847 A1 * | 10/2018 | Lee ............... H04L 9/06 |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0173945 A1 * | 6/2021 | Karr ............... G06F 3/0622 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMWARE, "Multipathing Configuration for Software ISCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: ISCSI Implementation for Dell EMC Storage Arrays Running PowerMaxOS," Technical White Paper, Sep. 2019, 35 pages.

Red Hat, Inc. "What is DIF/DIX (also known as PI)? Does Red Hatsupport it?" https://access.redhat.com/solutions/41548, Mar. 30, 2020, 5 pages.

U.S. Appl. No. 16/697,393 filed in the name of Vinay G. Rao et al., filed Nov. 27, 2019, and entitled "Automated Seamless Migration of Logical Storage Devices."

U.S. Appl. No. 16/710,828 filed in the name of Amit Pundalik Anchi et al., filed Dec. 11, 2019, and entitled "Automated Seamless Migration with Signature Issue Resolution."

* cited by examiner

FILE BASED ENCRYPTION FOR MULTI-PATHING DEVICES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. The storage ports are typically limited in number and each has limited resources for handling IO operations received from the host devices. Different ones of the host devices can run different applications with varying workloads and associated IO patterns. Such host devices also generate additional IO operations in performing various data services such as replication and migration so as to meet business continuity requirements.

SUMMARY

Illustrative embodiments configure a multi-path layer of one or more host devices to include functionality for encrypting and decrypting file data. For example, some embodiments include techniques for enabling host device multi-pathing software to identify data belonging to files and to encrypt and/or decrypt the identified file data.

In one embodiment, an apparatus comprises a processing device configured to control delivery of IO operations from a host device to a storage system over selected ones of a plurality of paths through a network. The processing device is further configured to identify whether operational information of the host device corresponding to a given write IO operation comprises one or more index nodes, and to analyze the one or more index nodes responsive to a positive identification. The processing device is also configured to determine whether one or more portions of data corresponding to the given write IO operation comprise file data based on the analysis of the one or more index nodes, to encrypt at least part of the file data responsive to an affirmative determination, and to deliver the given write IO operation comprising the encrypted file data to the storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
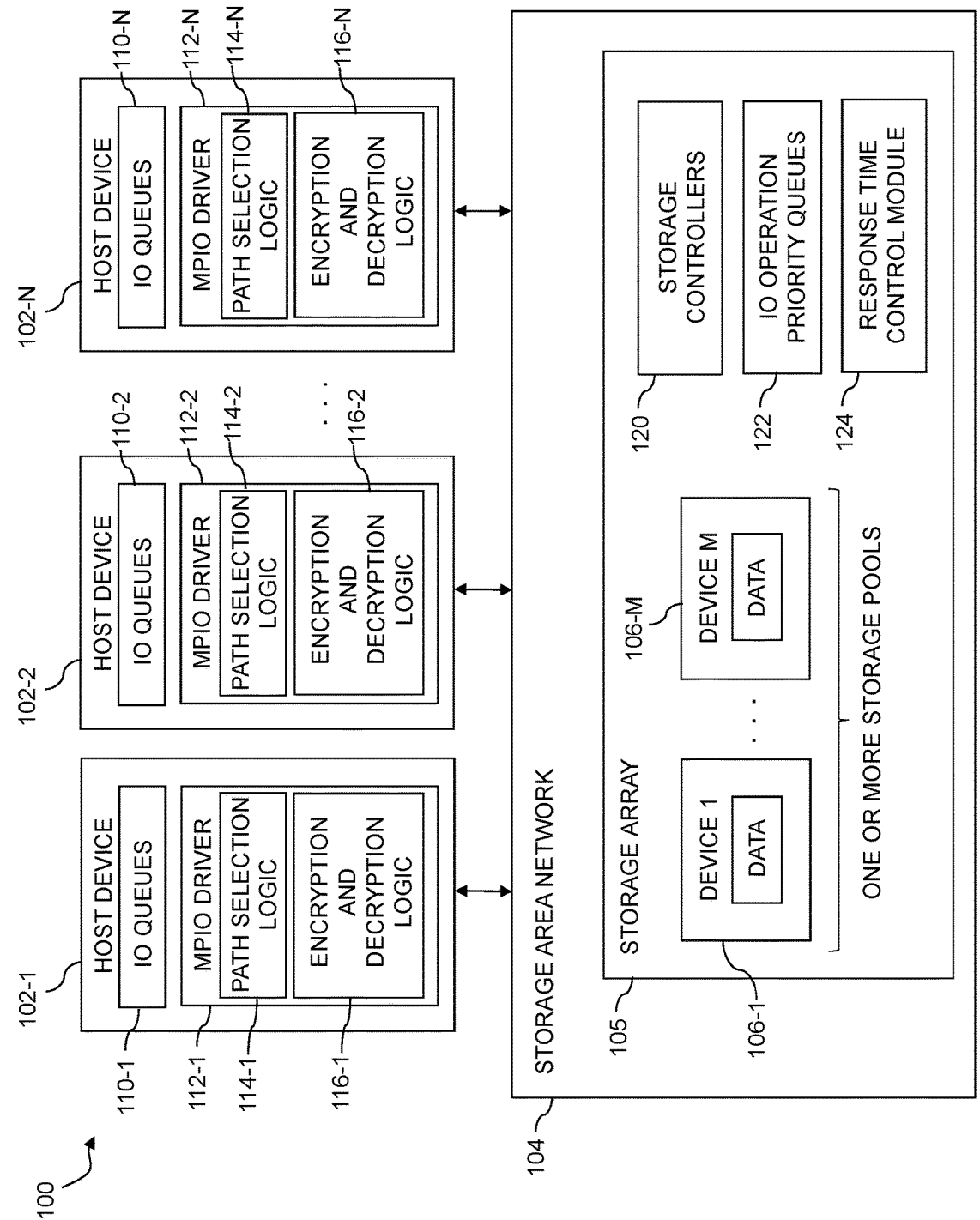
FIG. 1 is a block diagram of an information processing system configured with functionality in a multi-path layer of a host device for encrypting and decrypting file data in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement LUNs configured to store objects for users associated with the host devices 102. These objects can comprise files, blocks or other types of objects.

As used herein, the term "server" is to be broadly construed, and may encompass a host device, such as, for example, host device 102-1, a portion of a host device or a processing device separate from a host device.

The host devices 102 interact with the storage array 105 utilizing read and write commands as well as other types of commands, such as, for example, log select and log sense commands described further herein, that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for encrypting and decrypting file data. Such functionality is provided at least in part using respective instances of path selection logic 114-1, 114-2, . . . 114-N, and respective instances of encryption and decryption logic 116-1, 116-2, . . . 116-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for encrypting and decrypting file data. Other types of MPIO drivers from other driver vendors may be suitably modified to incorporate functionality for encrypting and decrypting file data as disclosed herein. For ease of explanation, references herein are to an MPIO driver 112-1 performing tasks associated with encryption and/or decryption of file data. However, it is to be understood that the functionality described in connection with the MPIO driver 112-1 can be similarly performed by a kernel module (e.g., independent kernel module) in multi-pathing or non-multi-pathing scenarios.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the WIPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105, or other types of functions, such as log sense commands to send requests to the storage array 105 for data corresponding to performance of one or more switch fabrics in the SAN 104. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, log select and log sense commands as described herein, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well as to discover the disappearance of any existing LUNs that have been deleted from the storage array 105.

The MPIO driver 112-1 in some embodiments comprises a user-space portion and a kernelspace portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As is apparent from the foregoing, MPIO driver 112-1 of host device 102-1 is configured to control delivery of IO operations from the host device 102-1 to the storage array 105 over selected paths through the SAN 104.

Encryption is used to transfer data securely. In one or more embodiments, data to be transferred from a host device 102-1 to a storage array 105 can be encrypted by the host device 102-1 prior to being transmitted to the storage array 105. The data is securely stored in the encrypted format. When the data is required by the host device 102-1, the encrypted data is transmitted to and decrypted by the host device 102-1.

The MPIO driver 112-1 is further configured with encryption and decryption logic 116-1 to identify data belonging to files and encrypt and/or decrypt the identified file data without encrypting and/or decrypting other data such as, for example, file metadata, file system metadata or block data. The term "file data" or "data belonging to a file" as used herein is intended to be broadly construed, so as to encompass, for example, data in file storage, file-level storage and/or file-based storage, which includes data that is stored in directories, sub-directories, folders and/or sub-folders, and is accessible via a path to the directory, sub-directory, folder and/or sub-folder. The term "non-file data" or "data not belonging to a file" as used herein is intended to be broadly construed, so as to encompass, for example, data not in file storage, file-level storage and/or file-based storage, metadata (which may include file metadata and/or file system metadata) and block data, which is data that is partitioned into blocks (e.g., equal sized blocks) and stored separately, in some cases, in multiple environments.

The encryption and decryption logic 116-1 utilizes information present in an operating system to determine whether data corresponding to an IO operation belongs to a file. After determining the IO data that belongs to files, the encryption and decryption logic 116-1 only encrypts and/or decrypts the determined file data. The encryption and decryption logic 116-1 is further configured to encrypt and/or decrypt only selected file types. In one or more embodiments, a user can select certain file types (e.g., mp4, pdf, jpeg, etc.) to be encrypted and decrypted, so that the encryption and decryption logic 116-1 will encrypt and decrypt only IO data corresponding to the selected file types. Additional examples of encrypting and decrypting file data are described below in conjunction with the embodiments of FIGS. 1 through 6.

In one or more embodiments, the encryption and decryption logic 116-1 is configured to identify whether operational information of the host device 102-1 corresponding to a given write IO operation comprises one or more index nodes (inodes). The operational information corresponding to the given write IO operation comprises, for example, one or more IO operation pages. An "IO operation page" as used herein is intended to be broadly construed and may include, for example, data which may be the subject of an IO operation (e.g., write or read IO operations) such as, but not necessarily limited to, block data, file data, file metadata and/or file system metadata. An IO operation page may further include one or more inodes. The term "index node" or "inode" as used herein is intended to be broadly construed, so as to encompass, for example, any data structure that describes file system objects such as, but not necessarily limited to, files or directories (e.g., folders). An inode stores details such as, for example, storage device locations of data, file-system attributes such as metadata including modification and access times, file ownership, file type and permission data. An inode can be identified by an integer, such as an i-number or inode number.

Figures 4A, 4B:
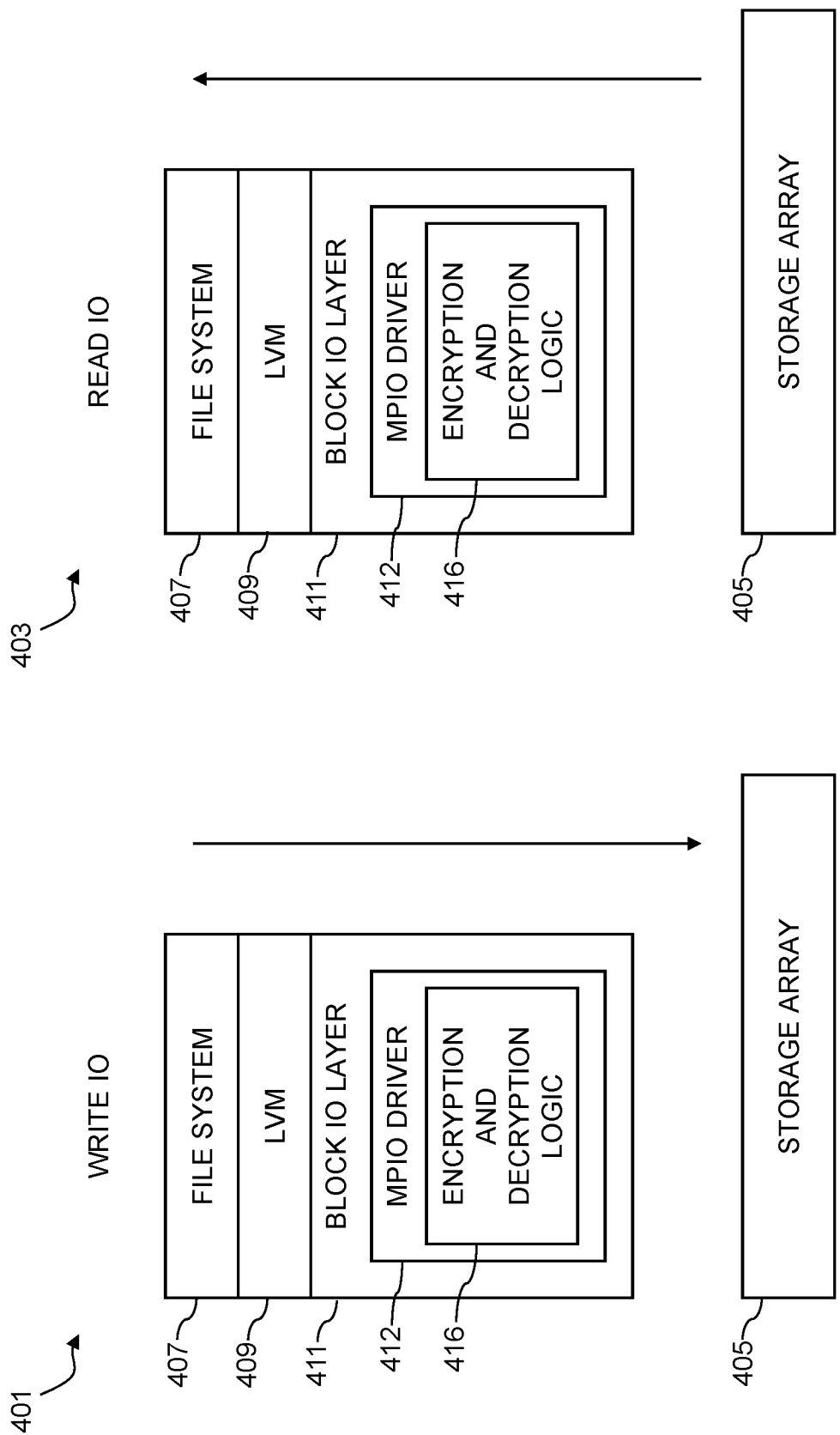
FIG. 4A is a block diagram illustrating encryption for a write IO operation in an illustrative embodiment.
FIG. 4B is a block diagram illustrating decryption for a read IO operation in an illustrative embodiment.

Referring to the write IO operation flow 401 in FIG. 4A, an MPIO driver 412 comprising encryption and decryption logic 416, which can be the same as or similar to the MPIO driver 112-1 and encryption and decryption logic 116-1, searches for write IO operation pages comprising information about data to be written, including inodes to which the data corresponds. For example, if the encryption and decryption logic 116-1 or 416 identifies one or more inodes in the write IO operation pages, the encryption and decryption logic 116-1 or 416 analyzes the one or more inodes to determine if data corresponding to the given write IO operation comprises file data. If references to inodes are not found in the write IO operation pages or the encryption and decryption logic 116-1 or 416 determines that the found inodes correspond to block data objects or other non-file data, then the encryption and decryption logic 116-1 or 416 concludes that a given write IO operation does not correspond to any file data.

If write IO operation pages that reference inodes corresponding to file data are found, the encryption and decryption logic 116-1 or 416 classifies the write IO operation pages as including file data, and encrypts the file data. Other data, not classified as file data is not encrypted. In one or more embodiments, prior to performing encryption, the encryption and decryption logic 116-1 or 416 further analyzes the inodes to determine file names and/or file types of the file data, and determines whether any of the file types and/or file names match with specified file types and/or file names to be encrypted. If matches are found, the encryption and decryption logic 116-1 or 416 encrypts the data in the write IO operation pages corresponding to the matching file types and/or file names, and moves the encrypted file data and other non-encrypted data to appropriate paths for transmission to a storage array 105 or 405 to complete the write IO operation(s). According to an embodiment, the specified file types and/or file names are received as an input by the host device 102-1 from, for example, a user. Other data, not matching the specified file types and/or file names is not encrypted.

Referring to the read IO operation flow 403 in FIG. 4B, once a read from a storage array 405 (or 105) is completed, an MPIO driver 412 comprising encryption and decryption logic 416, which can be the same as or similar to the MPIO driver 112-1 and encryption and decryption logic 116-1, classifies the read IO data. Similar to a write IO operation, the encryption and decryption logic 416 or 116-1 searches for read IO operation pages comprising information about read data, including inodes to which the data corresponds. For example, the encryption and decryption logic 416 or 116-1 is configured to identify whether operational information of the host device 102-1 corresponding to a given read IO operation (e.g., read IO operation pages) comprises one or more inodes. For example, if the encryption and decryption logic 116-1 or 416 identifies one or more inodes in the read IO operation pages, the encryption and decryption logic 116-1 or 416 analyzes the one or more inodes to determine if data corresponding to the given read IO operation comprises file data. If references to inodes are not found in the read IO operation pages or the encryption and decryption logic 416 or 116-1 determines that the found inodes correspond to block data objects or other non-file data, then the encryption and decryption logic 416 or 116-1 concludes that a given read IO operation does not correspond to any file data.

However, if read IO operation pages that reference inodes corresponding to file data are found, the encryption and decryption logic 116-1 or 416 classifies the read IO operation pages as including file data, and decrypts the file data. In one or more embodiments, prior to performing the decryption, the encryption and decryption logic 116-1 or 416 analyzes the inodes to determine file names and/or file types of the file data, and determines whether any of the file types and/or file names match with specified file types and/or file names to be decrypted. If matches are found, the encryption and decryption logic 116-1 or 416 decrypts the data in the read IO operation pages corresponding to the matching file types and/or file names, and moves the decrypted file data and other data to other layers of the host device to complete the read IO operation(s). Other data, not matching the specified file types and/or file names is not decrypted. Encryption and/or decryption can be performed using one or more encryption/decryption techniques such as, for example, Advanced Encryption Standard (AES) type encryption/decryption.

Referring to FIGS. 4A and 4B, the MPIO driver 412 may be a component of a block IO layer 411 (e.g., Linux block IO layer), which is part of a device (e.g., host device) comprising a logical volume manager (LVM) 409 and one or more file systems 407 for storing and managing data. The one or more file systems 407 can include, for example, fourth extended (EXT4), third extended (EXT3) and/or XFS file systems created for Linux. According to one or more embodiments, the encryption and decryption logic 116-1 or 416 intercepts IO queues (e.g., IO queues 110-1) using one or more functions such as, for example, a q_rq function, to perform encryption. Using one or more functions, the encryption and decryption logic 116-1 or 416 also intercepts IO completion operations to perform decryption.

Figure 5:
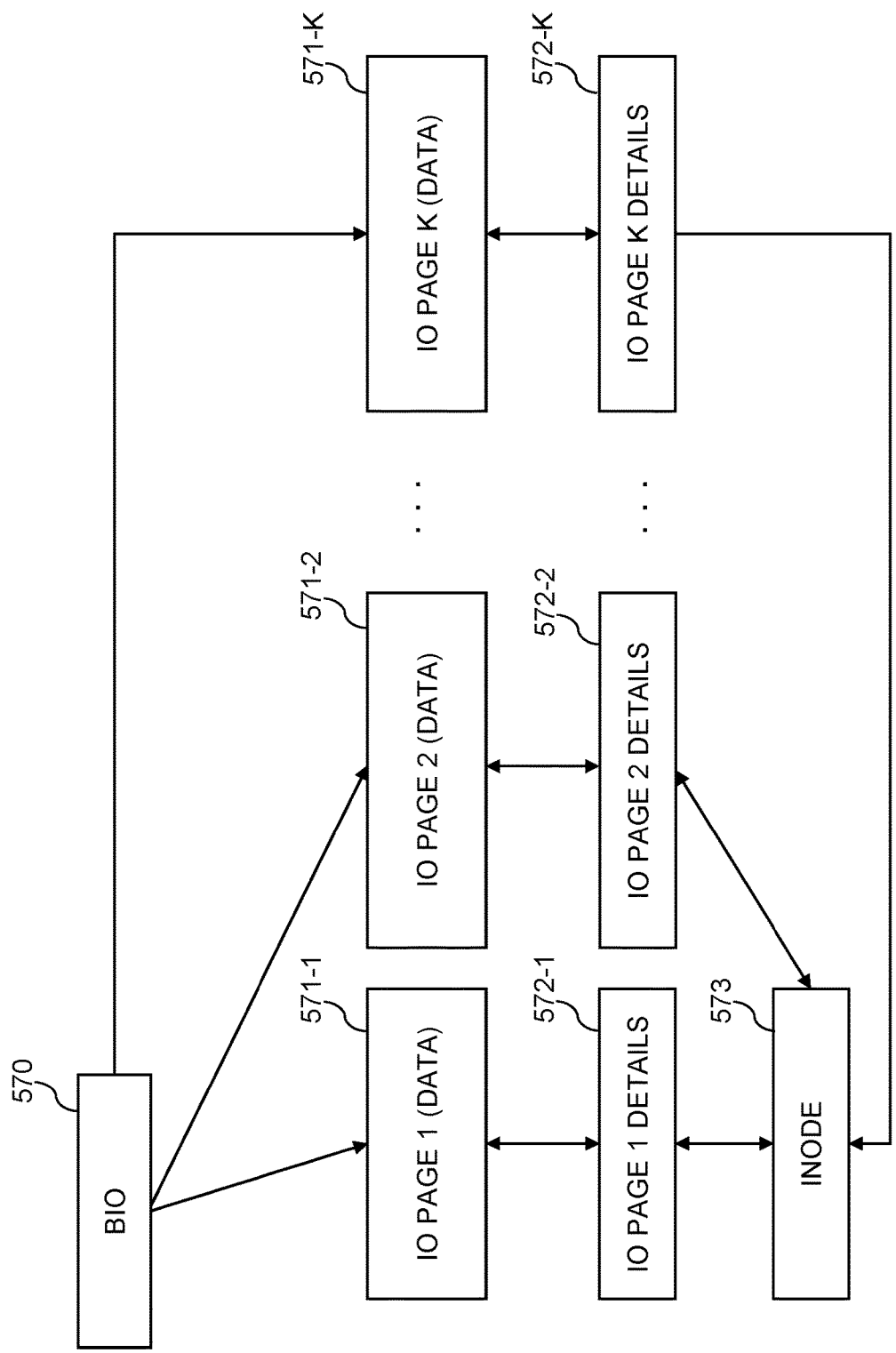
FIG. 5 is a block diagram illustrating extraction of data details from IO operation pages and corresponding index nodes (inodes) in an illustrative embodiment.

Referring to FIG. 5, in one or more embodiments, the encryption and decryption logic 116-1 retrieves the IO operational information (e.g., IO operation pages) of the host device 102-1 from a basic IO (BIO) 570 of the host device 102-1. For example, IO operation pages 1, 2, . . . K are retrieved from the BIO 570 and analyzed by the encryption and decryption logic 116-1. Each of the IO operation pages 1, 2, . . . K includes data corresponding to one or more IO operations 571-1, 571-2, . . . 571-K, and details 572-1, 572-2, . . . , 572-K about whether a given page corresponds to at least one inode 573. If a given page corresponds to an inode, the encryption and decryption logic 116-1 analyzes the inode to determine the file name and file type associated with the data to determine whether encryption and/or decryption should be performed.

In some embodiments, a Data Integrity Field/Data Integrity Extension (DIF/DIX) feature is used to provide the MPIO driver 112-1, and more specifically, the encryption and decryption logic 116-1, with information regarding whether data has been encrypted and needs to be decrypted after a read operation. DIF/DIX is supported by both SCSI and NVMe (Non-Volatile Memory Express) protocols. The DIF/DIX feature adds 8 bytes to the end of each sector on a storage device 106-1. These extra 8 bytes include an "Application Tag" field. According to one or more embodiments, the extension field is modified by the MPIO driver 112-1 to indicate if a sector of data is encrypted or not encrypted. More specifically, the MPIO driver 112-1 causes an encrypted bit to be written along with the encrypted IO data on a storage device 106-1. When the encryption and decryption logic 116-1 identifies a file that needs to be encrypted, the encryption and decryption logic 116-1 encrypts the file and enables a bit in the "Application Tag" field which indicates that encryption has occurred. While processing any encrypted data in a read operation, the encryption and decryption logic 116-1 recognizes that the file data is encrypted by the bit in the "Application Tag" field indicating that encryption has occurred. Based on the identification of encrypted data using DIF/DIX techniques, the encryption and decryption logic 116-1 performs decryption of the encrypted data in a read IO operation. Such metadata specifying whether a file has been encrypted may be useful when a designation of specified file types and/or file names to be subject to encryption and/or decryption changes after a file has already been encrypted and written to a storage array 105. If the encrypted file is no longer one of the specified file types, the DIF/DIX techniques permit the MPIO driver 112-1 to still recognize the encrypted file in a read operation even though the encrypted file no longer matches with a specified file type.

Figure 6:
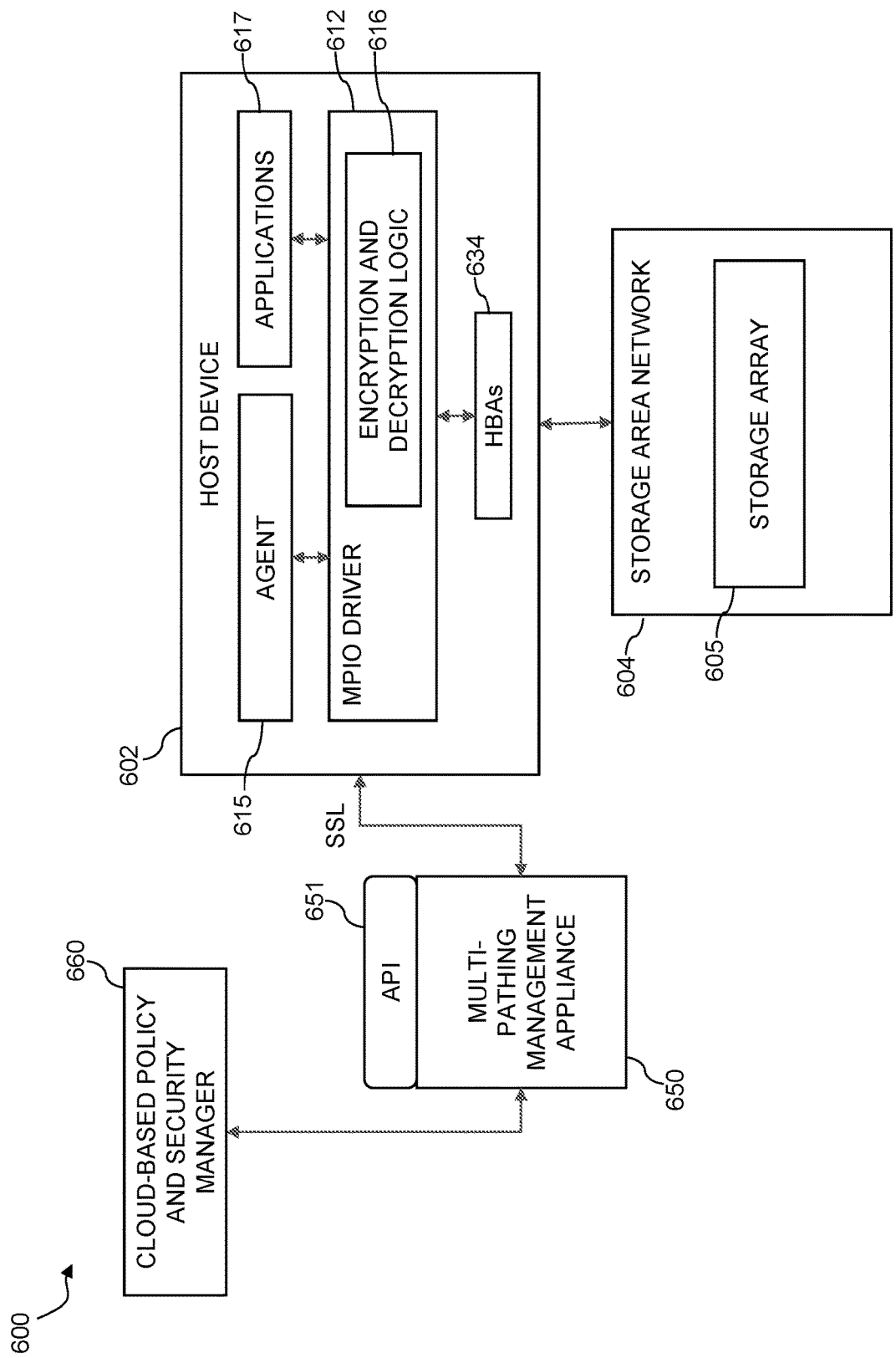
FIG. 6 is a block diagram of a cloud-based policy and security manager configured for providing encryption key management for a host device in an illustrative embodiment.

Referring to the architecture 600 in FIG. 6, in an embodiment, a cloud-based policy and security manager 660 provides encryption key management for an MPIO driver 612 of a host device 602. Encryption/decryption keys are provided from the cloud-based policy and security manager 660 to the MPIO driver 612 through a multi-pathing management appliance 650 utilizing an API 651 such as, for example, a REST API. The management appliance 650 connects to the host device 602 via a secure link such as, for example, a secure sockets layer (SSL) link. The MPIO driver 612 is configured with encryption/decryption logic 616 to perform encryption and decryption as described herein. Paths from the host device 602 to a storage array 605 through a SAN 604 illustratively comprise paths associated with respective initiator-target pairs, with each initiator comprising an HBA of a plurality of HBAs 634 or other initiating entity of the host device 602 and each target comprising a port or other targeted entity corresponding to one or more storage devices of the storage array 605. Applications 617 running on the host device 602 each include one or more processes that perform application functionality. The processes issue IO operations for delivery to the storage array 605. One or more agents 615 provide interfaces between the cloud-based policy and security manager 660 and the MPIO driver 612, and/or between the multi-pathing management appliance 650 and the MPIO driver 612. The host device 602 may comprise, but is not necessarily limited to, a Linux, Windows, AIX or VMware operating system.

In the FIG. 1 embodiment, the storage array 105 comprises a plurality of storage controllers 120, IO operation priority queues 122 and response time control module 124. The response time control module 124 may be used to implement storage array-based adjustments in response time for particular IO operations based at least in part on service level objective (SLO) information stored by the storage array 105 in its persistent memory. The response time control module 124 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105. Process tags may be used in assigning different ones of the IO operations to different ones of the IO operation priority queues 122, as disclosed in U.S. Pat. No. 10,474,367, issued Nov. 12, 2019, and entitled "Storage System with Input-Output Performance Control Utilizing Application Process Detection," which is incorporated by reference herein.

Additional components not explicitly shown in the figure, such as one or more storage caches, may also be provided in the storage array 105 for use in processing IO operations.

For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

Information can be obtained by the host device 102-1 from the storage array 105, or information can be obtained by the storage array 105 from the host device 102-1 utilizing an in-band communication mechanism in which one or more predetermined commands in a designated storage protocol are sent from the host device 102-1 to the storage array 105 or vice versa. Such predetermined commands can comprise, for example, log sense and log select commands, a mode sense command, a VU command, or combinations of multiple instances of these or other commands, in an otherwise standardized command format, such as a SCSI format or other type of format.

Additionally or alternatively, information can be obtained by the host device 102-1 from the storage array 105, or information can be obtained by the storage array 105 from the host device 102-1 utilizing an out-of-band communication mechanism. For example, an out-of-band communication mechanism of this type can involve host management software of the host device 102-1 communicating with storage array management software of the storage array 105 over an IP network connection or other type of network connection.

These and other functions related to encrypting and decrypting file data that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to encrypt and decrypt file data are intended to be broadly construed, and should not be viewed as being limited to any particular storage arrangement, such as storage in a particular host device component or using a particular format. Accordingly, such storage can be in a memory or other storage device that is outside of the MPIO driver.

Absent use of the techniques for encrypting and decrypting file data as disclosed herein, legacy host devices and MPIO drivers indiscriminately encrypt IO data without regard to whether the data is file data or non-file data, such as, for example, metadata or block data. In general, it may not be necessary to encrypt and/or decrypt metadata (e.g., file metadata or file system metadata) and/or block data. However, conventional techniques do not differentiate between file data and metadata, between file data and block data or between file data and other non-file data when performing encryption and decryption. In addition, current techniques do not allow for encryption and/or decryption of selected file types or files having particular file names or portions of file names. For example, a user may want to encrypt only certain types of files (e.g., mp4, pdf, jpeg files, etc.) or only files having certain phrases or terms as all or part of their file names, but current approaches do not provide functionality for encrypting and/or decrypting specific file types or files with specified file names.

Such drawbacks are advantageously overcome in illustrative embodiments herein by utilization of a multi-path layer comprising one or more of the MPIO drivers 112 to encrypt and decrypt file data as described above. These embodiments therefore provide a significant advance over conventional configurations that are not equipped for encrypting and decrypting file data or specific types of file data. For example, host devices in illustrative embodiments are advantageously configured to encrypt and/or decrypt only file data, so that metadata and block data are not encrypted, thereby conserving computational resources. As an additional advantage, the embodiments provide users with control over which file types are encrypted. The embodiments are also useful in connection with file provisioned storage arrays to encrypt only file data.

The above-described functions associated with encrypting and decrypting file data in the MPIO driver 112-1 are carried out at least in part under the control of its path selection logic 114-1 and/or encryption and decryption logic 116-1. For example, the path selection logic 114-1 and/or encryption and decryption logic 116-1 are illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for encrypting and decrypting file data.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in "Dell EMC SC Series Storage and Microsoft Multipath I/O," Dell EMC, CML 1004, July 2018, which is incorporated by reference herein. Such conventional MPIO functionality is suitably modified in illustrative embodiments disclosed herein to support encrypting and decrypting file data.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VIVIAX®, Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 and encryption and decryption logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
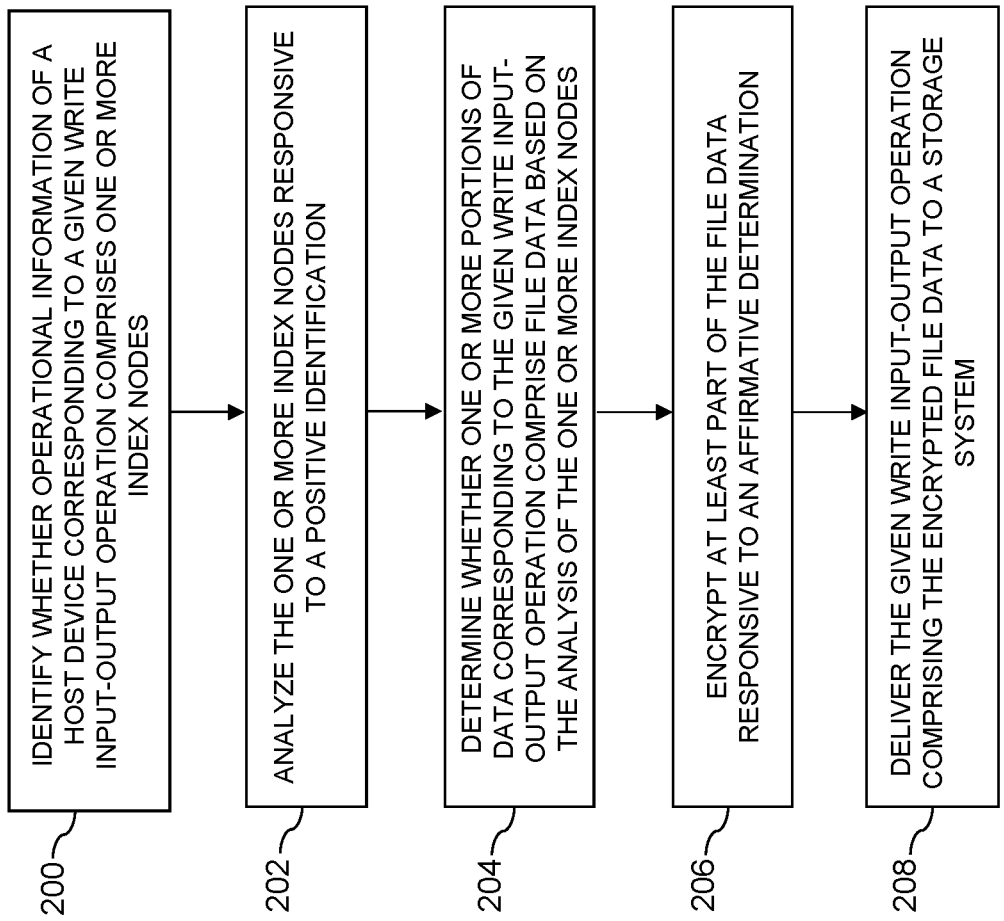
FIG. 2 is a flow diagram of a process for encrypting and decrypting file data in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 and/or encryption and decryption logic 116-1 of the MPIO driver 112-1 of host device 102-1. Other arrangements of host device components (e.g., kernel modules) and/or other system components can be configured to perform at least portions of one or more of the steps in other embodiments.

In step 200, a host device identifies whether operational information of the host device corresponding to a given write IO operation comprises one or more index nodes. In one or more embodiments, the operational information of the host device corresponding to the given write IO operation comprises one or more IO operation pages. In step 202, the one or more index nodes are analyzed responsive to a positive identification.

In step 204, the host device determines whether one or more portions of data corresponding to the given write IO operation comprise file data based on the analysis of the one or more index nodes. In steps 206 and 208, at least part of the file data is encrypted responsive to an affirmative determination, and the given write IO operation comprising the encrypted file data is delivered to a storage system.

In one or more embodiments, one or more file types of the file data are determined based on the analysis of the one or more index nodes, and the host device determines whether the one or more file types correspond to one or more specified file types. In this case, the part of the file data that is encrypted comprises the one or more specified file types. The one or more specified file types may be received as an input by, for example, a user. Using index node information, file type of one or more files is identified. If the file type is one selected by a user for encryption, then the one or more files with that file type are encrypted.

In accordance with illustrative embodiments, the host device identifies whether operational information of the host device corresponding to a given read IO operation comprises one or more additional index nodes. The one or more additional index nodes are analyzed responsive to a positive identification of whether the operational information corresponding to the given read IO operation comprises the one or more additional index nodes. The host device determines whether one or more portions of data corresponding to the given read IO operation comprise read file data based on the analysis of the one or more additional index nodes. The read file data is decrypted responsive to an affirmative determination of whether the one or more portions of data corresponding to the given read IO operation comprise read file data. The operational information of the host device corresponding to the given write and the given read IO operations may comprise a plurality of IO operation pages.

In illustrative embodiments, if there is a determination that operational information of the host device corresponding to the given write IO operation does not comprise one or more index nodes, the host device determines that at least part of the data corresponding to the given write IO operation lacks file data. In this case, the given write IO operation is delivered to the storage system without encrypting the part of the data lacking the file data.

According to the embodiments, one or more other portions of data corresponding to the given write IO operation may be determined to comprise data other than file data based on the analysis of the one or more index nodes, and the given write IO operation is delivered to the storage system without encrypting the one or more other portions of data comprising the data other than file data.

In one or more embodiments, the host device is configured to enable one or more bits in an extension field of a storage device to indicate that at least part of the file data has been encrypted. In a read IO operation, the host device recognizes the one or more bits indicating that the part of the file data has been encrypted, and decrypts the part of the file data based on the recognition.

Multiple additional instances of the FIG. 2 process may be performed in respective additional host devices that share the storage array. Other embodiments can include multiple storage arrays, with the disclosed functionality for encrypting and decrypting file data being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for encrypting and decrypting file data. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement the disclosed functionality for encrypting and decrypting file data within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
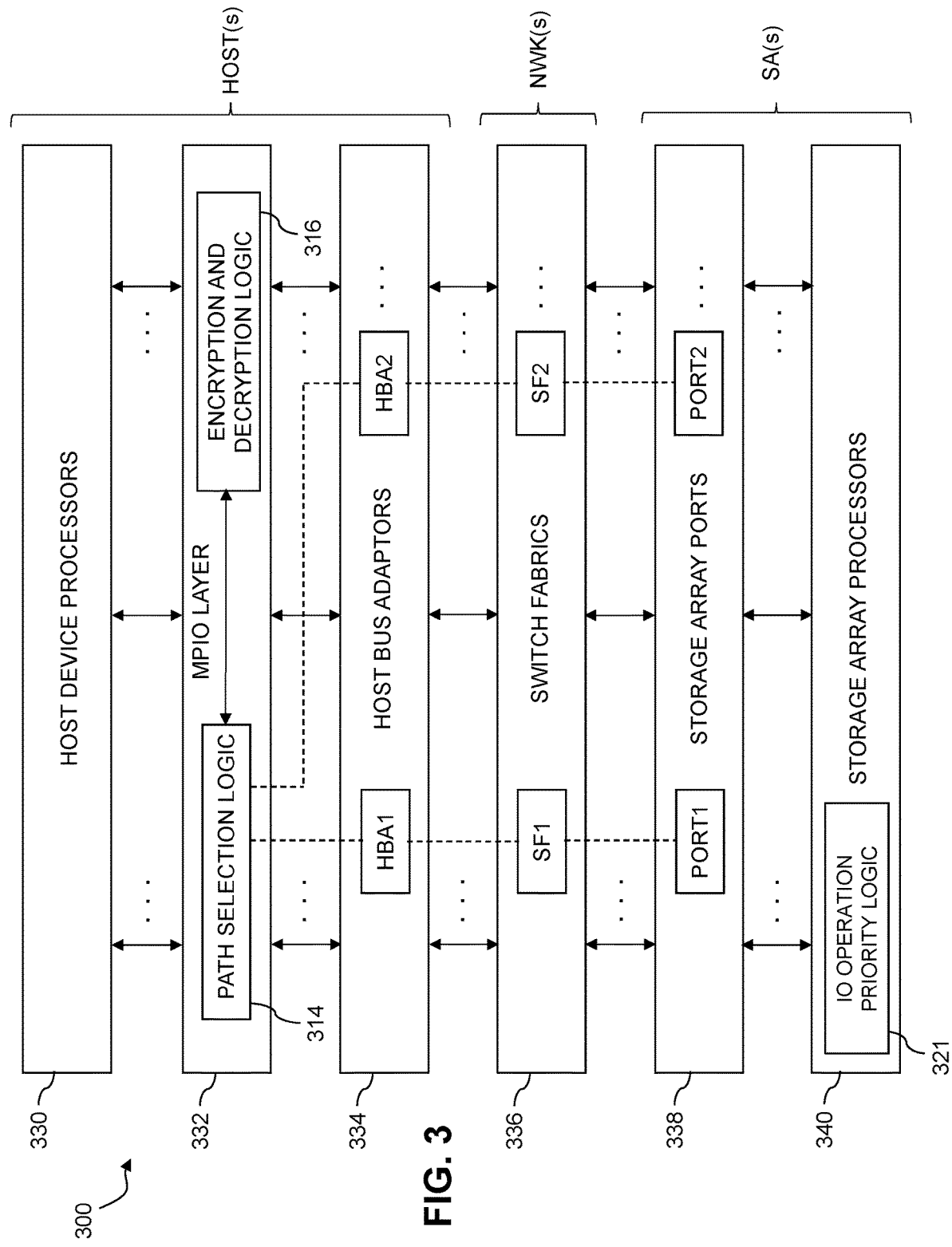
FIG. 3 is a block diagram showing multiple layers of a layered system architecture that includes a multi-path layer with functionality for encrypting and decrypting file data in an illustrative embodiment.

Referring now to FIG. 3, another illustrative embodiment is shown. In this embodiment, an information processing system 300 comprises one or more instances of path selection logic 314, encryption and decryption logic 316 and IO operation priority logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements encrypting and decrypting of file data as characterized by encryption and decryption logic 316. The encryption and decryption logic 316 is illustratively shown as part of the MPIO layer 332. Alternatively, the encryption and decryption logic 316 in other embodiments is illustratively stored, at least partially, in the host device processor layer 330. It is also possible in some embodiments that the encryption and decryption logic 316 can be incorporated within a data structure of the path selection logic 314. The encryption and decryption logic 316 (or 116) illustratively searches for write IO operation pages comprising information about data to be written, including inodes to which the data corresponds. If references to inodes are not found in the write IO operation pages or the encryption and decryption logic 316 determines that the found inodes correspond to non-file data, then the encryption and decryption logic 316 concludes that a given write IO operation does not correspond to any file data.

However, if write IO operation pages that reference inodes corresponding to file objects are found, the encryption and decryption logic 316 classifies the write IO operation pages as including file data. The encryption and decryption logic 316 analyzes the inodes to determine file names and/or file types, and determines whether any of the file names and/or file types match with selected file names and/or file types to be encrypted. If matches are found, the encryption and decryption logic 316 encrypts the data corresponding to the matching file types and/or file names, and moves the encrypted file data and other non-encrypted data to appropriate paths for transmission to a storage array to complete the write IO operation.

In a read IO operation, once a read from a storage array is performed, the encryption and decryption logic 316 searches for read IO operation pages comprising information about read data, including inodes to which the data corresponds. If references to inodes are not found in the read IO operation pages or the encryption and decryption logic 316 determines that the found inodes correspond to non-file data, then the encryption and decryption logic 316 concludes that a given read IO operation does not correspond to any file data.

However, if read IO operation pages that reference inodes corresponding to file objects are found, the encryption and decryption logic 316 driver classifies the read IO operation pages as including file data. The encryption and decryption logic 316 analyzes the inodes to determine file names and/or file types, and determines whether any of the file names and/or file types match with selected file types to be decrypted. If matches are found, the encryption and decryption logic 316 decrypts the data corresponding to the matching file types and/or file names, and moves the decrypted file data and other decrypted data to other layers of a host device to complete the read IO operation(s).

The MPIO layer 332 is an example of what is also referred to herein as a multi-path layer, and comprises one or more MPIO drivers implemented in respective host devices. Each such MPIO driver illustratively comprises an instance of path selection logic 314 and encryption and decryption logic 316 configured to implement functionality for encrypting and decrypting file data substantially as previously described. Additional or alternative layers and path selection and/or encryption and decryption logic arrangements can be used in other embodiments.

The IO operation priority logic 321 implemented in the storage array processor layer 340 controls different levels of performance for IO operations. For example, the IO operation priority logic 321 provides different priority levels for different ones of the IO operations by assigning different ones of the IO operations to different IO operation priority queues. It is also possible in some embodiments that the IO operation priority logic 321 can include multiple distinct IO operation priority logic instances for multiple IO queues of respective ones of a plurality of host devices of the system 300.

In the system 300, path selection logic 314 is configured to select different paths for sending IO operations and/or commands from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations and/or commands to the one or more storage arrays having the storage array ports of the storage array port layer 338. In selecting the paths, the path selection logic 314 illustratively limits amounts of IO operations and/or commands that are delivered over one or more paths to particular ones of the ports of a storage array.

It is assumed in this embodiment that the host devices through their respective MPIO drivers and respective instances of path selection logic 314 and encryption and decryption logic 316 provide functionality for encrypting and decrypting file data, possibly with involvement of other host device components.

Accordingly, in some embodiments, the path selection logic 314 utilizes the encryption and decryption logic 316 in determining appropriate paths over which to send particular IO operations and/or commands to ports of one or more storage arrays. As described elsewhere herein, such encryption and decryption of file data can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The particular features and functionality of the illustrative embodiments described above can be varied in other embodiments.

Also, as mentioned previously, different instances of the above-described algorithms and other file data encryption and decryption techniques can be performed by different MPIO drivers in different host devices.

The particular file data encryption and decryption arrangements described above are therefore presented by way of illustrative example only. Numerous alternative arrangements of these and other features can be used in implementing the file data encryption and decryption functionality in other illustrative embodiments.

The illustrative embodiments disclosed herein can provide a number of significant advantages relative to conventional arrangements that fail to provide selection for types of data to be encrypted and/or decrypted. Advantageously, the embodiments configure a multi-path layer of one or more host devices to include functionality for encrypting and decrypting file data, leading to enhanced overall performance and more efficient use of computing resources. These embodiments provide a significant advance over conventional techniques, which do not configure host devices to determine which data belongs to files, and limit encryption and decryption to the file data and, in some cases, further limit encryption and decryption to specific file types. For example, illustrative embodiments are advantageously configured to enable hosts to identify data belonging to files and encrypt and/or decrypt the identified file data without encrypting and/or decrypting other data such as, for example, metadata and/or block data. In one or more embodiments, a user can select certain file types to be encrypted and decrypted, so that a multi-pathing driver will encrypt and decrypt only IO data corresponding to the selected file types.

Advantageously, the embodiments further enable MPIO drivers of host devices to utilize a DIF/DIX feature to provide the MPIO drivers with information regarding whether data has been encrypted and needs to be decrypted after a read operation. According to one or more embodiments, the MPIO driver modifies an extension field at the end of a sector on a storage device to indicate if a sector of data is encrypted or not encrypted, which causes an encrypted bit to be written along with encrypted IO data on a storage device. While reading any encrypted data, the MPIO driver recognizes that the file data is encrypted by the bit in the extension field indicating that encryption has occurred. Based on the identification of encrypted data using DIF/DIX techniques, the MPIO driver performs decryption of the encrypted data in a read IO operation. Such techniques prove useful when an encrypted file is no longer one of the specified file types designated for encryption so that an MPIO driver is still able to recognize the encrypted file in a read operation even though the encrypted file no longer matches with a specified file type.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system.

Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and encryption and decryption logic 116 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, encryption and decryption logic and additional or alternative components. Also, the particular configurations of system and device elements and associated processing operations illustratively shown in the drawings can be varied in other embodiments. For example, a wide variety of different MPIO driver configurations and associated file data encryption and decryption arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   wherein the at least one processing device is configured:
   to control delivery of input-output operations from a host device to a storage system over selected ones of a plurality of paths through a network;
   to identify whether operational information of the host device corresponding to a given write input-output operation comprises one or more index nodes;
   to analyze the one or more index nodes responsive to a positive identification;
   to determine whether one or more portions of data corresponding to the given write input-output operation comprise file data based on the analysis of the one or more index nodes;
   to encrypt at least part of the file data responsive to an affirmative determination; and
   to deliver the given write input-output operation comprising the encrypted file data to the storage system.

2. The apparatus of claim 1 wherein the operational information of the host device corresponding to the given write input-output operation comprises one or more input-output operation pages.

3. The apparatus of claim 1 wherein the at least one processing device is further configured:
   to identify whether operational information of the host device corresponding to a given read input-output operation comprises one or more additional index nodes;
   to analyze the one or more additional index nodes responsive to a positive identification of whether the operational information corresponding to the given read input-output operation comprises the one or more additional index nodes; and to determine whether one or more portions of data corresponding to the given read input-output operation comprise read file data based on the analysis of the one or more additional index nodes.

4. The apparatus of claim 3 wherein the at least one processing device is further configured to decrypt the read file data responsive to an affirmative determination of whether the one or more portions of data corresponding to the given read input-output operation comprise read file data.

5. The apparatus of claim 4 wherein the operational information of the host device corresponding to the given write and the given read input-output operations comprises a plurality of input-output operation pages.

6. The apparatus of claim 1 wherein the at least one processing device is further configured to determine one or more file types of the file data based on the analysis of the one or more index nodes.

7. The apparatus of claim 6 wherein:
the at least one processing device is further configured to determine whether the one or more file types correspond to one or more specified file types; and
wherein the part of the file data that is encrypted comprises the one or more specified file types.

8. The apparatus of claim 7 wherein the at least one processing device is further configured to receive as an input the one or more specified file types.

9. The apparatus of claim 1 wherein the at least one processing device is further configured to determine that at least part of the data corresponding to the given write input-output operation lacks the file data responsive to a negative identification.

10. The apparatus of claim 9 wherein the at least one processing device is further configured to deliver the given write input-output operation to the storage system without encrypting the part of the data lacking the file data.

11. The apparatus of claim 1 wherein the at least one processing device is further configured:
to determine that one or more other portions of data corresponding to the given write input-output operation comprise data other than file data based on the analysis of the one or more index nodes; and
to deliver the given write input-output operation to the storage system without encrypting the one or more other portions of data comprising the data other than file data.

12. The apparatus of claim 1 wherein the at least one processing device comprises at least one multi-path input-output driver implemented in the host device and configured to control delivery of the input-output operations to storage devices of the storage system over the selected ones of the plurality of paths through the network.

13. The apparatus of claim 1 wherein the at least one processing device is further configured to enable one or more bits in an extension field of a storage device to indicate that at least the part of the file data has been encrypted.

14. The apparatus of claim 13 wherein the at least one processing device is further configured:
to recognize in a read input-output operation the one or more bits indicating that at least the part of the file data has been encrypted; and
to decrypt the part of the file data based on the recognition.

15. A computer program product comprising a non-transitory processor-readable storage medium having stored therein program code of one or more software programs, wherein the program code, when executed by at least one processing device comprising a processor coupled to a memory, causes the at least one processing device:
to control delivery of input-output operations from a host device to a storage system over selected ones of a plurality of paths through a network;
to identify whether operational information of the host device corresponding to a given write input-output operation comprises one or more index nodes;
to analyze the one or more index nodes responsive to a positive identification;
to determine whether one or more portions of data corresponding to the given write input-output operation comprise file data based on the analysis of the one or more index nodes;
to encrypt at least part of the file data responsive to an affirmative determination; and
to deliver the given write input-output operation comprising the encrypted file data to the storage system.

16. The computer program product of claim 15 wherein the operational information of the host device corresponding to the given write input-output operation comprises one or more input-output operation pages.

17. The computer program product of claim 15 wherein the program code further causes the at least one processing device:
to identify whether operational information of the host device corresponding to a given read input-output operation comprises one or more additional index nodes;
to analyze the one or more additional index nodes responsive to a positive identification of whether the operational information corresponding to the given read input-output operation comprises the one or more additional index nodes; and
to determine whether one or more portions of data corresponding to the given read input-output operation comprise read file data based on the analysis of the one or more additional index nodes.

18. The computer program product of claim 17 wherein the program code further causes the at least one processing device to decrypt the read file data responsive to an affirmative determination of whether the one or more portions of data corresponding to the given read input-output operation comprise read file data.

19. A method comprising:
controlling delivery of input-output operations from a host device to a storage system over selected ones of a plurality of paths through a network;
identifying whether operational information of the host device corresponding to a given write input-output operation comprises one or more index nodes;
analyzing the one or more index nodes responsive to a positive identification;
determining whether one or more portions of data corresponding to the given write input-output operation comprise file data based on the analysis of the one or more index nodes;
encrypting at least part of the file data responsive to an affirmative determination; and
delivering the given write input-output operation comprising the encrypted file data to the storage system.

20. The method of claim 19 wherein the operational information of the host device corresponding to the given write input-output operation comprises one or more input-output operation pages.

* * * * *